No. 627,335. Patented June 20, 1899.
W. JOHNSON.
VELOCIPEDE.
(Application filed Sept. 7, 1898.)
(No Model.)
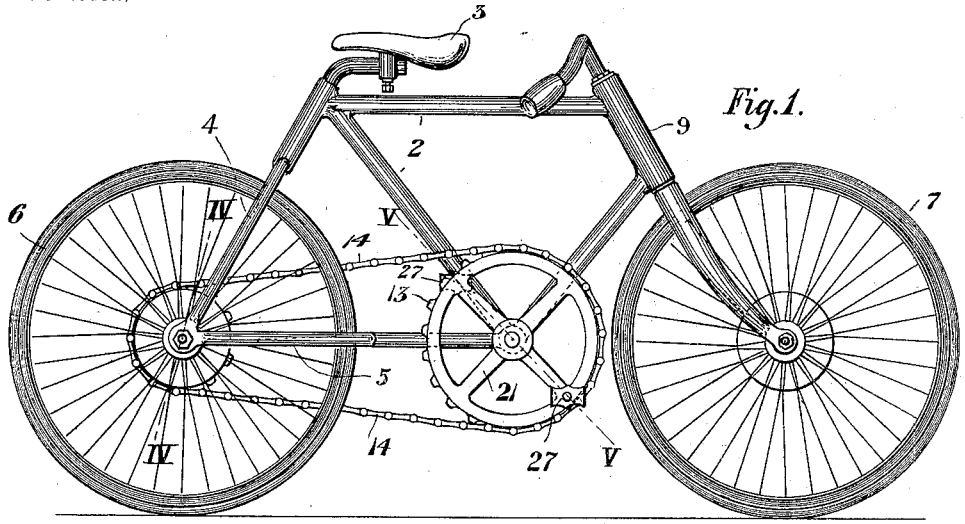
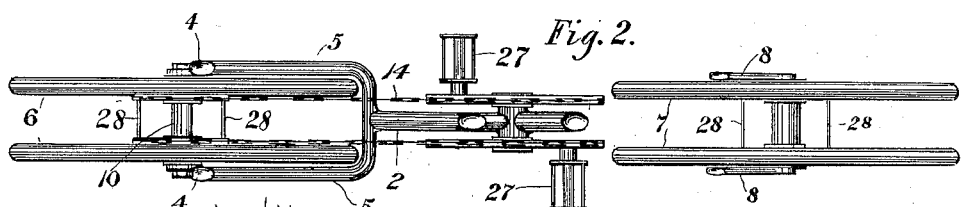
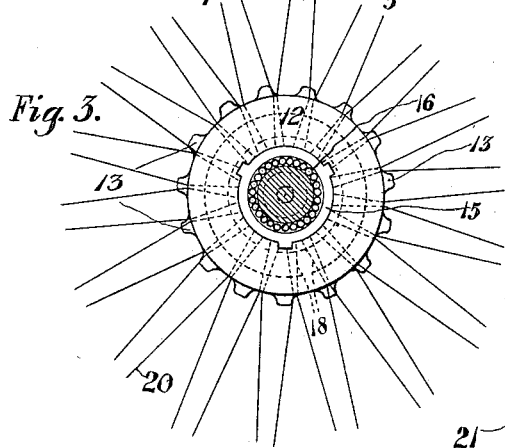
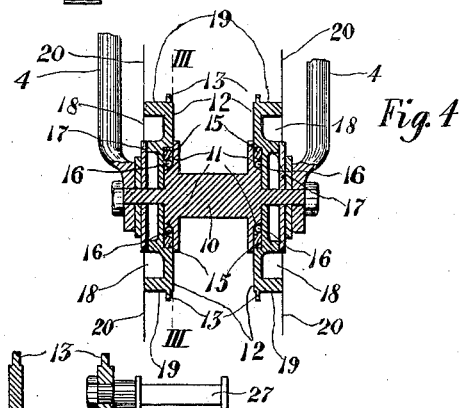
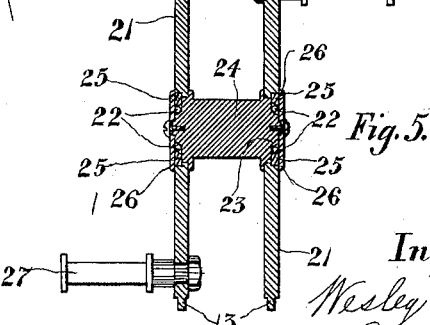
Witnesses:
E. J. Edwards
C. C. Butterfield
Inventor:
Wesley Johnson
by O. M. Clarke
his Attorney.

UNITED STATES PATENT OFFICE.

WESLEY JOHNSON, OF PITTSBURG, PENNSYLVANIA.

VELOCIPEDE.

SPECIFICATION forming part of Letters Patent No. 627,335, dated June 20, 1899.

Application filed September 7, 1898. Serial No. 690,416. (No model.)

*To all whom it may concern:*

Be it known that I, WESLEY JOHNSON, a citizen of the United States, residing at Pittsburg, in the county of Allegheny and State of Pennsylvania, have invented or discovered a new and useful Improvement in Velocipedes, of which the following is a full, clear, and exact description, reference being had to the accompanying drawings, forming part of this application, in which—

Figure 1 is a view in side elevation of my improved velocipede. Fig. 2 is a plan view with the upper framework removed. Fig. 3 is a detail view of the inner face of one of the back sprockets constituting the revoluble hub, indicated by line III III of Fig. 4. Fig. 4 is a cross-sectional view indicated by the line IV IV of Fig. 1. Fig. 5 is a cross-sectional view indicated by the line V V of Fig. 1.

My invention relates to velocipedes; and it consists of a machine provided with four wheels mounted in a frame similar to a bicycle and provided with suitable driving mechanism, as shall be hereinafter more fully set forth.

Referring now to the drawings, 2 is the frame of the machine, constructed of light tubing in the usual manner, provided with a saddle 3. Between the divided members 4 and 5 of the frame are mounted the rear driving-wheels 6, the framework being separated sufficiently to permit the wheels to be mounted with a considerable space—say four to six inches—between them. The forward wheels 7 are similarly mounted between the forks 8, which are arranged with a swivel-bearing in the head 9, as is customary in bicycles. The purpose of so mounting the back and forward wheels is to give stability and balance to the machine, and it will be seen that as the main portion of the frame is of a size conforming to that of an ordinary bicycle the rider will experience no inconvenience from the excessive width of the front and back forks.

I have shown the machine as constructed with a diamond frame; but it will be readily understood that a drop-frame may be made equally as well.

Mounted rigidly between the rear forks 4 5 is a stationary axle 10, upon the exterior faces 11 of which are circular ball-races.

The rear-wheel hubs consist of a main plate 12, upon the periphery of which are the sprocket-teeth 13, adapted to engage the driving-chain 14, and the plate 12 is recessed at its center and provided with a bearing-ring 15 of hardened metal, between which ring and the ball-race is placed the row of balls 16, upon which the plate revolves, thereby obviating friction. A central disk 17 of reduced diameter is secured to the plate 12 at a sufficient distance beyond it to prevent interference between the chain and tire, and from the disk 17 radiate the spokes 18 of the wheel, being secured to the rim in the usual manner. The plate 12 is extended laterally by a flange 19, to which the free spokes 20, continuations of spokes 18, are secured, the object being to provide a central hub of as great diameter as possible, thereby rendering the wheel stiff and unyielding. This construction is of advantage when the wheel is made with straight spokes, as is the case in my machine, thereby overcoming the tendency to "buckle."

The driving sprocket-wheels 21 (two in number) are independently mounted on rows of balls 22, adapted to revolve on the reduced neck 23 of the middle sprocket-wheel shaft 24, incorporated in the main frame of the machine. Each sprocket-wheel is provided with a hardened bearing-ring 25, the sprocket-wheels being retained in position by washers 26, secured upon the base 24. It will thus be seen that each driving sprocket-wheel is independently mounted and the pedals 27 are secured to the body portion of the wheels 21, which thus take the place of the ordinary cranks. In this manner I am enabled to use the double arrangement of driving sprocket-wheels without increasing the tread. Inasmuch as the driven sprocket-wheels are considerably enlarged, the driving-wheels are enlarged in proportion, and it will be understood that the relation between the driving and driven wheels may be changed to secure the gear required.

The front wheels are mounted in a manner similar to the back, and in each case the hubs of the wheels may be joined by cross-bars 28, thereby stiffening the construction.

While the driving sprocket-wheels are independent of each other and not connected, their relation to each other will be maintained by reason of the chains in engagement with the rear-wheel hubs.

The advantages of my invention consist in its great stability and safety. It is of especial value to bicycle learners, as one unaccustomed to riding and balancing a bicycle may sit upon my velocipede while at rest or in motion without danger of falling. For this reason it is also peculiarly adapted to the use of elderly people or invalids or those apt to become timid, as confidence is easily established in its safety. Corners may be turned on slippery ground with greater security, the driving-gear is very compact, and generally my machine possesses features of advantage and merit which will commend it to the users of velocipedes for the reasons stated.

Having described my invention, what I claim, and desire to secure by Letters Patent, is—

In a velocipede, the combination of a main frame provided with rear forked extensions of excessive width, a similar forward pivotally-mounted fork, double forward wheels provided with stiffening cross-bars mounted on a hub secured in the forward forks with intervening ball-bearings, a stationary axle secured between the rear forks having double circular ball-races on its exterior faces, double rear-wheel hubs having sprocket-teeth on their peripheries and annularly recessed on their inner faces, provided with rings of hardened metal and mounted on balls adapted to rotate on the ball-races of the hub, stiffening cross-bars connecting the rear wheels, double independent driving sprocket-wheels mounted on the outer reduced ends of a stationary sprocket-wheel shaft incorporated in the frame of the machine with intervening ball-bearings, pedals secured to such driving sprocket-wheels, and independent sprocket-chains connecting the driving sprocket-wheels with the rear driven sprocket-wheels, substantially as set forth.

In testimony whereof I have hereunto set my hand.

WESLEY JOHNSON.

Witnesses:
PETER J. EDWARDS,
C. M. CLARKE.